Figure 1:
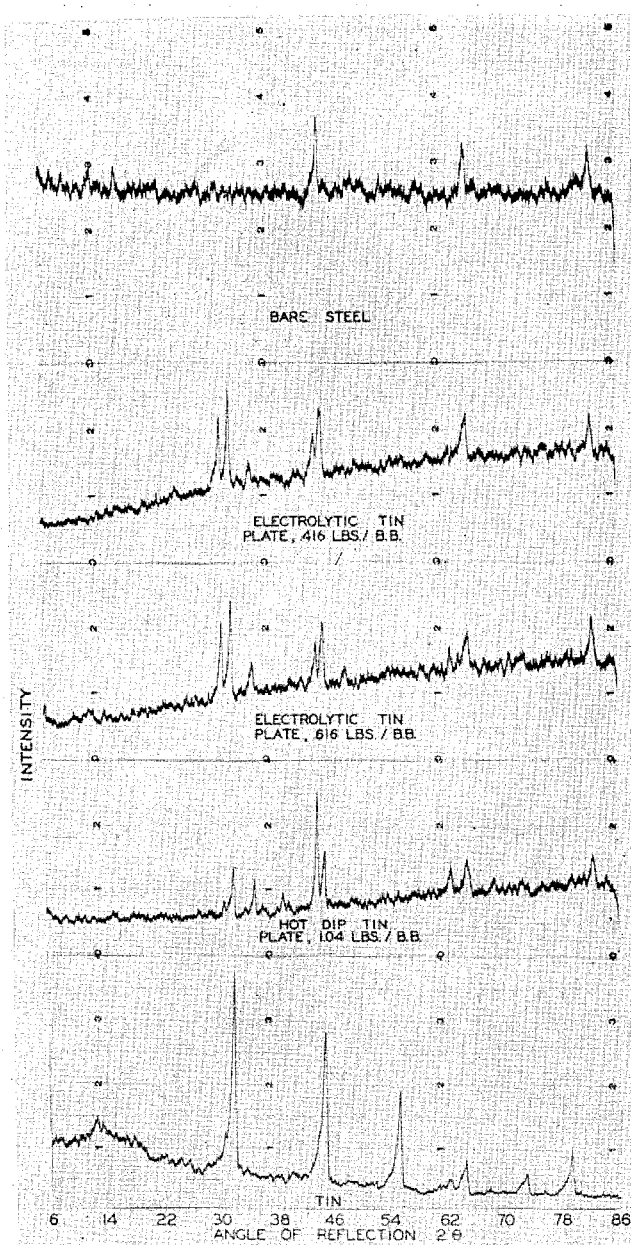

Sept. 12, 1950  H. F. BEEGHLY  2,521,772
METHOD OF DETERMINING THE THICKNESS
OF A METAL COATING ON A METAL BASE
Filed Oct. 24, 1947  2 Sheets-Sheet 1

INVENTOR.
HUGH F. BEEGHLY

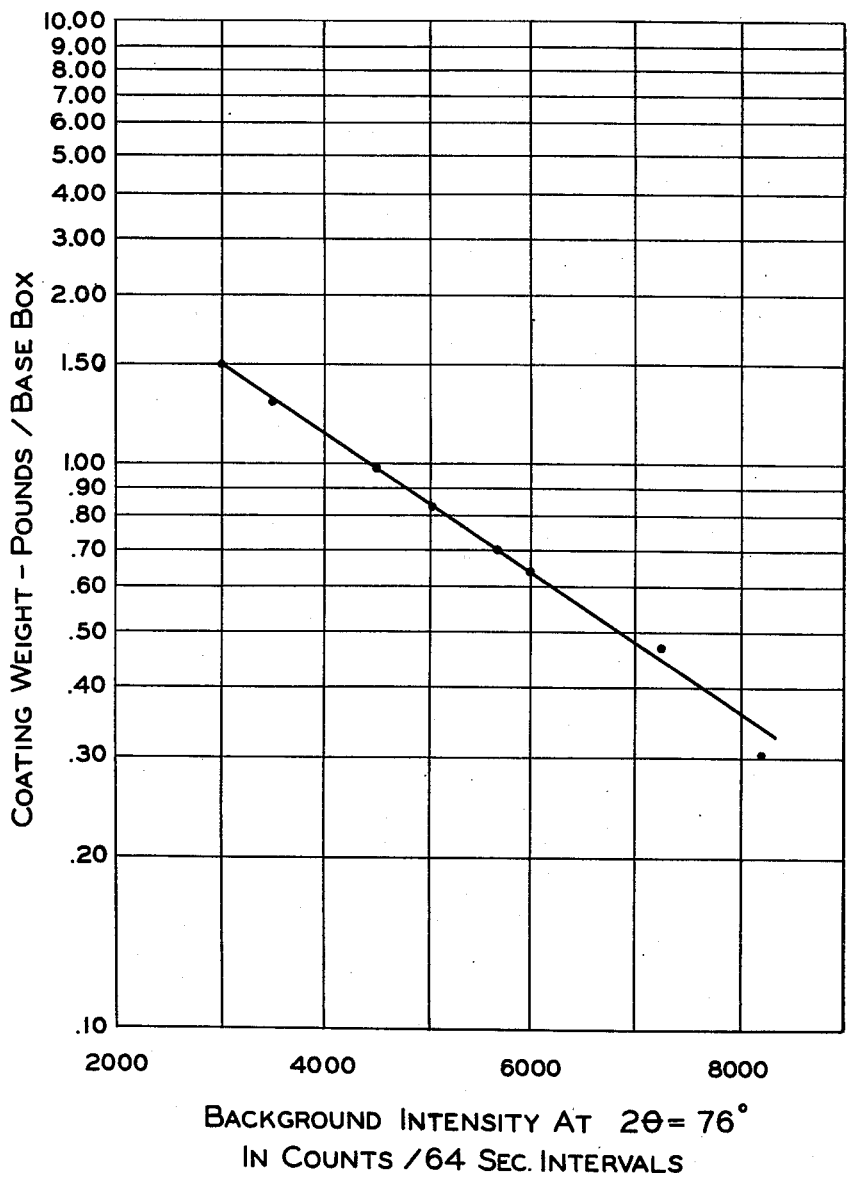

Patented Sept. 12, 1950

2,521,772

UNITED STATES PATENT OFFICE 2,521,772

METHOD OF DETERMINING THE THICKNESS OF A METAL COATING ON A METAL BASE

Hugh F. Beeghly, Whitehall, Pa., assignor to Jones & Laughlin Steel Corporation, Pittsburgh, Pa., a corporation of Pennsylvania Application October 24, 1947, Serial No. 781,815

4 Claims. (Cl. 250—51)

This invention is concerned with methods of measuring the thickness of metallic coatings deposited upon a metallic base, and more particularly with the use of X-rays to determine the thickness of non-ferrous protective coatings on steel sheet and strip.

An object of my invention is to provide a rapid and precise method of determining the thickness of coating metal on a steel base without destroying the sample. Another object is to provide such a method which will determine the coating metal thickness on each side individually of the sample. Another object is to provide such a method which is adapted to the continuous gauging of such coatings on continuous steel strip and the like. Other objects will appear in the course of the disclosure of my invention.

The metals commonly used as protective coatings on steel sheet and strip are tin and zinc, applied either by hot-dipping or by electroplating processes. The determination of the thickness of such coatings, prior to my invention, has been effected almost entirely by chemical means, although magnetic means have also been developed for comparative measurement. Chemical methods of coating weight (or thickness) determination all comprise some method of stripping the coating from a sample of known area and determining the amount of coating metal so obtained, and suffer from several disadvantages. A sample must be cut from the product for each test, thus wasting material. Where the base metal is coated on both sides, which is the usual case, the coating weight given by chemical methods is the average of that of the two sides of the sample. Most important, however, from the production standpoint, chemical methods are too slow for continuous process control of coating weight.

I have invented a method of coating weight determination using X-rays that is free from the above-mentioned undesirable features. The method of my invention is precise, non-destructive, rapid, and—most important—requires no physical contact with material being gauged. It is thus adapted for continuous gauging of electrotinned or electrogalvanized strip and the like.

It is well-known that a beam of X-rays directed upon a crystalline substance is diffracted, and that as the angle of incidence of the beam is varied the intensity of the diffracted ray varies. Every crystalline substance is characterized by a number of such angles at which the intensity of the diffracted beam is high relative to that at intermediate angles. The angle of incidence and the wavelength of the X-ray beam so diffracted are related to the crystalline structure of the substance by the classic Bragg equation. These characteristic angles of high intensity for a given substance and a given X-ray wavelength are somewhat analagous to the characteristic lines in the visible spectrum of an unknown sample and may be used to identify an unknown in the same way as the characteristic lines in the visible spectrum are used for identification.

X-rays penetrate appreciable thicknesses of metal, losing intensity by absorption in a manner which can be mathematically related to the thickness of the metal. It has been proposed, therefore, to determine the thickness of metallic coatings on metallic bases by directing a beam of X-rays upon a sample at an angle characteristic of the base metal and measuring the reduction in intensity of the diffracted ray due to absorption in the coating metal. It has also been proposed to measure coating thickness by comparison of diffracted energy at angles characteristic of the base metal and coating metal respectively. Both of these methods, depending on measurement of radiation at sharply defined angles, require precise positioning of X-ray source, specimen, and measuring device, and so, while perhaps adaptable to laboratory determination, are not at all suitable for continuous measurement of tin or zinc coated strip, for example.

My invention, which avoids entirely the foregoing difficulty, makes use of another property of X-rays—one generally considered objectionable. X-rays are generated by bombarding a metallic target with electrons in an evacuated tube. The material of which the target is made determines the wavelength of the X-rays emitted. It is sometimes observed when an X-ray beam of known wavelength is directed upon a metallic specimen that, in addition to diffracted rays of the known wavelength, other radiation of a different wavelength is also detected. This latter radiation, or fluorescence, is found to be of a wavelength which would be characteristic of the specimen material if it were used as a target, and is called secondary radiation because it is generated in the specimen by primary radiation directed upon it. This secondary radiation is generally considered a nuisance because it is random in angular distribution and may be strong enough to mask or swamp diffracted radiation. In conventional X-ray diffraction practice, therefore, every effort is made to select an X-ray wavelength which produces a minimum of secondary radiation from the specimen material.

I have discovered that if, contrary to accepted teaching, an X-ray wavelength is chosen which produces a large amount of secondary radiation from the base metal of the sample, this previously considered undesirable secondary radiation can be used to determine coating metal thickness in a simple manner. The secondary radiation from the base metal is, of course, partially absorbed by the coating metal. Therefore the measured intensity of this radiation at any fixed point is less from coated than from uncoated base metal. I have further discovered that, with proper control, the relation between coating metal weight and secondary radiation intensity can be made substantially linear in the case of tinplate, for example, and so affords a convenient gauge of tin coating thickness.

As the secondary radiation from the base metal is distributed relatively uniformly over the angular spectrum, except perhaps at very small angles of incidence, the process of my invention requires no precise adjustment of angles of incidence and reflection. It is only necessary to avoid those angles which are characterized by high intensity of diffracted radiation from base metal or coating metal. It is possible by the method of my invention to make the sample a moving strip of tinplate and obtain a continuous measurement of coating thickness having an accuracy quite sufficient for manufacturing control.

As has been mentioned, it is desirable to select X-rays of wavelengths which will produce a relatively high level of secondary radiation from the base metal of the specimen. It is also desirable to select X-rays of wavelengths which will not excite secondary radiation from the coating metal of the specimen, as this would confuse the determination. Secondary radiation is not excited by any and all X-rays that may fall on a given metal, but only by those of wavelengths below a certain critical value characteristic of the metal. This critical value is generally denominated the "absorption edge" or "absorption limit" for the particular metal. Thus, for the purposes of my invention, it is desirable to limit the exciting radiation to wavelengths below the absorption limit for the base metal but above the absorption limit for the coating metal.

For the determination of the thickness of tin coatings on an iron base, I have found desirable radiation is that falling between the wavelengths 1.737 and .424 angstrom units, these figures representing the K-absorption limits for iron and tin respectively. Thus, I have found copper, which gives off K-alpha radiation of about 1.54 angstrom units, and nickel, which emits K-alpha radiation of about 1.65 angstrom units, two metals suitable for targets. It will be understood by those skilled in the art of X-ray analysis that the X-ray tubes using these targets should be operated in such manner that the so-called continuous spectrum radiation of wavelengths short enough to excite secondary radiation from the tin coating of the sample is minimized. In practice this requirement is easily met by employment of the proper tube voltage or use of the proper filter.

However, I do not find it necessary to confine the radiation employed to excit the specimen to the K-alpha-1 wavelength or any other individual wavelength or narrow band of wavelengths. I find it satisfactory to excite a tinplate specimen, for example, with the full or unfiltered spectrum of radiation produced from a copper target.

My invention may be carried out with apparatus readily available commercially. A medium voltage X-ray tube, operating at not more than about 50,000 volts, is a satisfactory source of X-rays. The intensity of the secondary radiation may be measured by conventional devices, such as photographic film or plate, Geiger-Mueller counter tube, photocell, or the like.

Figure 1 illustrates results I have obtained by the process of my invention, using a 35,000 volt X-ray tube with copper target as a source of X-rays and a Geiger-Mueller counter tube adapted to operate a strip chart recorder as intensity measuring means. The ordinate of all curves is intensity of diffracted X-rays, in arbitrary units; the abscissa is the angle between the incident and refracted beams, designated as $2\theta$. The top curve shown is for a sample of bare or uncoated steel, the three below are for steel coated with tin in amounts of .416 lb. per base-box, .616 lb. per base-box, and 1.04 lbs. per base-box, respectively, and the bottom curve is for tin alone. A "base-box" is the unit by which tinplate is sold and corresponds to tinplate sheets having an area of 31,360 sq. in., both sides. It will be observed, first, that the intensity level of the measured radiation changes only slowly with change in the angle $2\theta$ for each of the curves shown, except for sharply defined peaks which, in the case of the top curve, are those characteristic of iron alone, in the case of the bottom curve are characteristic of tin alone, and for the three intermediate curves are characteristic of both tin and iron. Second, except at values of $2\theta$ corresponding to these peaks, the intensity of the measured radiation, which is substantially all secondary radiation, diminishes with increase in coating weight. The intensity of the measured radiation may therefore be employed as a measure of tin coating weight.

It will be understood that for routine determination of tin coating weights it is unnecessary to plot the intensity of measured radiation over an angular spectrum as was done in Figure 1. It is necessary to make only one measurement of the intensity of the secondary radiation from the sample, at a predetermined and fixed value of $2\theta$ which, as has been mentioned, should be selected to avoid the peaks of radiation characteristic of tin and iron. Practical considerations favor a large value of $2\theta$, as a larger angle of incidence of the radiation minimizes variations in the positioning of the specimen and measuring apparatus. I have found 76° a desirable value of $2\theta$ for tinplate work, but it is obvious that many other values of this angle are also suitable. The method of my invention is, of course, comparative, but can be calibrated against gravimetric determination to give absolute coating weight values.

Figure 2 illustrates the degree of linearity between coating weight and measured radiation intensity which may be obtained by the process of my invention. The intensity here is measured by the number of impulses produced by a Geiger-Mueller counter tube in an interval of 64 seconds.

The invention is not limited to the preferred embodiment but may be otherwise embodied or practiced within the scope of the following claims.

I claim:

1. The method of determining the thickness of a coating of a metal on a base of a different metal comprising the steps of directing X-rays through the coating metal against the base metal, said X-rays being of wavelengths selected to excite substantially more secondary X-ray radiation from the base metal than from the coating metal, measuring the intensity of the resultant secondary radiation which is generated in the base metal after it passes through the coating metal, and comparing this measurement with like measurements of secondary radiation from the same kind of metal base through known thicknesses of the same kind of metal coating in order to determine the thickness of the metal coating being tested.

2. The method of determining the thickness of a coating of a metal on a base of a different metal comprising the steps of directing X-rays through the coating metal against the base metal, said X-rays being of wavelengths selected to excite a substantially maximum proportion of secondary X-ray radiation from the base metal relative to secondary X-ray radiation from the coating metal, measuring the intensity of the resultant secondary radiation which is generated in the base metal after it passes through the coating metal, said measurement being taken from a position not exposed to peak levels of diffracted radiation, and comparing this measurement with like measurements of secondary radiation from the same kind of metal base through known thicknesses of the same kind of metal coating in order to determine the thickness of the metal coating being tested.

3. The method of determining the thickness of a tin coating on an iron base comprising the steps of directing X-rays through the tin coating against the iron base, said X-rays being of wavelengths less than about 1.737 angstrom units but greater than about .424 angstrom unit, measuring the intensity of the resultant secondary radiation which is generated in the iron base after it passes through the tin coating, said measurement being taken from a position exposed to a minimum of diffracted radiation, and comparing this measurement with like measurements of secondary radiation from the same kind of base through known thicknesses of the same kind of coating in order to determine the thickness of the tin coating being tested.

4. The method of determining the thickness of a tin coating on an iron base comprising the steps of generating primary X-rays from a copper target and directing said X-rays from the target through the tin coating against the iron base, measuring the intensity of the resultant secondary radiation which is generated in the iron base after it passes through the tin coating, said measurement being taken from a position exposed to a minimum of diffracted radiation, and comparing this measurement with like measurements of secondary radiation from the same kind of base through known thicknesses of the same kind of coating in order to determine the thickness of the tin coating being tested.

HUGH F. BEEGHLY.

REFERENCES CITED

The following references are of record in the file of this patent:

UNITED STATES PATENTS

| Number | Name | Date |
| --- | --- | --- |
| 2,079,900 | Cohn | May 11, 1937 |
| 2,277,756 | Hare | Mar. 31, 1942 |
| 2,425,512 | Crumrine | Aug. 12, 1947 |
| 2,428,796 | Friedman | Oct. 14, 1947 |